Patented Sept. 15, 1942

2,295,985

UNITED STATES PATENT OFFICE 2,295,985

RUBBER ANTIOXIDANTS

William Baird and Maldwyn Jones, Blackley, Manchester, England, assignors to Imperial Chemical Industries Limited, a corporation of Great Britain No Drawing. Application January 29, 1940, Serial No. 316,226. In Great Britain February 27, 1939

3 Claims. (Cl. 260—619)

According to this invention we manufacture vulcanised rubber by vulcanising rubber hot in a mixture comprising added sulphur, vulcanisation accelerator and an antioxidant of the class defined below.

The said class consists of bis-(2-hydroxy-3:5-dimethylphenyl)alkylmethanes, in which the alkyl radical has not more than 6 carbon atoms.

By using this class of antioxidants in the way described above, rubber vulcanisates are obtained, which have very good resistance to ordinary ageing and which, in the case of white or clear coloured vulcanisates, are little if at all stained, after exposure to light.

British Patent No. 413,012 describes a cold vulcanisation process in which there is used as antioxidant a bis-(hydroxyphenyl)methane, which is substituted in at least 2 positions, one ortho to each hydroxyl group, which substituents are preferably methyl groups, and in which one or both of the methylene hydrogen atoms may be substituted, e. g. by the same or different straight-chain hydrocarbon residues. The antioxidants of the present invention confer greater resistance to oxidation than do those of British Patent 413,012.

The antioxidants of this invention are new compounds and may be made by condensing 2:4-dimethylphenyl with the appropriate aliphatic aldehyde in the presence of an acid condensing agent, e. g. hydrochloric or sulphuric acid.

The following examples, in which parts are by weight, illustrate but do not limit the invention.

Example 1

α:α - Bis-(2-hydroxy-3:5-dimethylphenyl) ethane is included in the following rubber mix:

| | Parts |
|---|---|
| Pale crepe rubber | 100 |
| Zinc oxide | 10 |
| Blanc fixe | 75 |
| Titanium dioxide | 10 |
| Stearic acid | 1 |
| Sulphur | 2.5 |
| Mercaptobenzthiazole | 0.5 |
| Antioxidants | 1 |

The mix is then vulcanised at 141° C. for 25 minutes.

A rubber vulcanisate with very good resistance to ordinary ageing and substantially unstained after exposure to light is obtained.

α:α - Bis-(2-hydroxy-3:5-dimethylphenyl) ethane may be made by boiling under a reflux condenser for 24 hours a solution of 40 parts of 2:4-dimethylphenol, 10 parts of acetaldehyde and 20 parts of 35% hydrochloric acid in 120 parts of ethyl alcohol, cooling, filtering, drying and recrystallising from benzene. It melts at 132–5° C.

In place of the antioxidant used above, there may be employed, for example, α:α-bis-(2-hydroxy-3:5-dimethylphenyl)butane, -isobutane or -heptane, which possess similar properties as antioxidants. These compounds may be prepared by the method described above for the corresponding ethane derivatives by using n-butaldehyde or iso-butaldehyde $(CH_3)_2CH.CHO$, or n-heptaldehyde in place of acetaldehyde. They have melting points as shown below:

α:α-Bis-(2-hydroxy-3:5-dimethylphenyl)butane, M. P. 123° C.

α:α - Bis -(2-hydroxy-3:5-dimethylphenyl) isobutane, M. P. 158–9° C.

α:α - Bis - (2 - hydroxy-3:5-dimethylphenyl) heptane, M. P. 133–5° C.

Example 2

To illustrate the greater resistance to oxidation conferred by compounds of the invention compared with compounds previously mentioned as non-staining antioxidants and related chemically to those of the present invention, mixes containing the various antioxidants were prepared as described in Example 1, vulcanised and subjected to tests. Accelerated ageing tests were done at 70° C. in oxygen at 300 lb./sq. in. The resistance to ageing was determined by the loss in tensile strength, in the usual manner, the following results being obtained:

| Antioxidant | Tensile strength kg./sq. mm. | |
|---|---|---|
| | Before ageing | After 12 days' ageing |
| α:α - Bis - (2 - hydroxy-3:5-dimethylphenyl) butane | 162 | 143 |
| β:β - Bis - (4 - hydroxy - 3 - methylphenyl) propane | 178 | 109 |
| Bis-(4-hydroxy-3:5-dimethylphenyl) methane | 160 | 67 |
| β:β - Bis - (4 - hydroxy - 3:5 - dimethylphenyl) propane | 131 | Perished |
| 1-benzyl-2-naphthol | 167 | 112 |

The 2nd, 3rd and 4th antioxidants in the above list are the antioxidants mentioned in British Patent 413,912. The 5th is an antioxidant of British Patent 356,425.

These results show clearly the superiority of α:α-bis-(2-hydroxy-3:5-dimethylphenyl)butane over the other antioxidants tested as regards resistance to oxygen. Tests on the staining effect of exposure to ultra-violet light were also made. These showed bis-(2-hydroxy-3:5-dimethylphenyl)butane to be slightly superior to the known substances mentioned in this example. It is to be noted that β:β-bis-(4-hydroxy-3:5-dimethylphenyl)propane retards cure markedly.

The compounds α:α-bis-(2-hydroxy-3:5-dimethylphenyl)ethane, -isobutane and heptane are substantially equal to the -butane compound in antioxidant and non-staining properties, when tested under the conditions described in this example.

Example 3

Mixes were prepared as described in Example 1, vulcanised and the vulcanisates subjected to accelerated ageing tests in an air oven at 70° C. for 6 weeks and tensile strength determinations made as usual. The following results were obtained:

| Antioxidant | Tensile strength: kg./sq.mm. | |
| --- | --- | --- |
|  | Before ageing | After ageing |
| α:α-Bis-(2-hydroxy-3:5-dimethylphenyl) butane | 165 | 127 |
| α:α-Bis-(2-hydroxy-3:5-dimethylphenyl) isobutane | 167 | 159 |
| α:α-Bis-(2-hydroxy-3:5-dimethylphenyl) heptane | 171 | 149 |

The above test figures show that the butane, isobutane and heptane derivatives confer a high degree of resistance to ageing in the air oven.

We claim:

1. Bis-(2-hydroxy-3:5-dimethylphenyl) alkylmethane in which the alkyl radical has not more than 6 carbon atoms.
2. Bis-(2-hydroxy-3:5-dimethylphenyl) n-propylmethane.
3. Bis-(2-hydroxy-3:5-dimethylphenyl) isopropylmethane.

WILLIAM BAIRD.
MALDWYN JONES.